United States Patent
Zheng

(10) Patent No.: US 10,116,620 B2
(45) Date of Patent: Oct. 30, 2018

(54) METHOD FOR ACCESS NETWORK VIRTUALIZATION AND PROXY NODE

(71) Applicant: Huawei Technologies Co., Ltd., Shenzhen (CN)

(72) Inventor: Ruobin Zheng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 159 days.

(21) Appl. No.: 15/153,431

(22) Filed: May 12, 2016

(65) Prior Publication Data

US 2016/0261556 A1 Sep. 8, 2016

Related U.S. Application Data

(63) Continuation of application No. PCT/CN2014/088348, filed on Oct. 11, 2014.

(30) Foreign Application Priority Data

Nov. 13, 2013 (CN) .......................... 2013 1 0567058

(51) Int. Cl.
| | |
|---|---|
| *H04L 12/56* | (2006.01) |
| *H04L 29/12* | (2006.01) |
| *H04L 12/28* | (2006.01) |
| *H04L 12/24* | (2006.01) |
| *H04L 29/08* | (2006.01) |
| *H04L 12/741* | (2013.01) |

(52) U.S. Cl.
CPC .......... *H04L 61/2503* (2013.01); *H04L 12/28* (2013.01); *H04L 12/2869* (2013.01); *H04L 41/0803* (2013.01); *H04L 45/745* (2013.01); *H04L 67/28* (2013.01); *H04L 67/2814* (2013.01); *H04L 2212/00* (2013.01)

(58) Field of Classification Search
CPC .................................................... H04L 61/2503
USPC .......................................................... 370/392
See application file for complete search history.

(56) References Cited

U.S. PATENT DOCUMENTS

| | | |
|---|---|---|
| 2004/0165581 A1 | 8/2004 | Oogushi |
| 2008/0080535 A1 | 4/2008 | Li et al. |
| 2009/0161677 A1 | 6/2009 | Zheng |

FOREIGN PATENT DOCUMENTS

| | | |
|---|---|---|
| CN | 101155136 A | 4/2008 |
| CN | 101299698 A | 11/2008 |
| CN | 101605099 A | 12/2009 |

*Primary Examiner* — Shripal Khajuria
(74) *Attorney, Agent, or Firm* — Leydig, Voit & Mayer, Ltd.

(57) ABSTRACT

An embodiment of the present invention discloses a method for access network virtualization and a proxy node, relates to a technical field of communication, and does not need to modify an existing management system when a new type of access network node is added into an original access network. The method of the present invention comprises: a proxy node establishing a relationship mapping table; the proxy node receiving a packet sent by a management system; the proxy node querying the relationship mapping table according to first parameter information to obtain second parameter information; and sending the packet to a remote access node corresponding to the second parameter information according to the second parameter information. The present invention is applicable to a proxy node.

18 Claims, 7 Drawing Sheets

METHOD FOR ACCESS NETWORK VIRTUALIZATION AND PROXY NODE

CROSS-REFERENCE TO RELATED APPLICATIONS

This application is a continuation of International Patent Application No. PCT/CN2014/088348, filed on Oct. 11, 2014, which claims priority to Chinese Patent Application No. 201310567058.X, filed on Nov. 13, 2013, both of which are hereby incorporated by reference in their entireties.

TECHNICAL FIELD

The present invention relates to the technical field of communications, and in particular, to a method for access network virtualization and a proxy node.

BACKGROUND

An optical access network is an access network in which an optical fiber serves as a main transmission medium, and is divided into an active optical access network and a passive optical access network according to system distribution. According to where an optical network unit is located, the passive optical access network may be divided into several types such as FTTH (fiber to the home), FTTB (fiber to the building), FTTC (fiber to the curb), FTTN (fiber to the node) and FTTDp (fiber to drop/distribution point) and the like. The passive optical network technology is a kind of point-to-multipoint optical access network technology comprising an OLT (optical line terminal), an ONU (optical network unit) or an ONT (optical network terminal) and an ODN (optical distribution network). An MDU (multi-dwelling unit) and an MTU (multi-tenant unit) are ONUs under types of the FTTB or the FTTC or the like. Both the MDU and the MTU are collectively referred to as an MxU, and the MxU is generally a frame-type device.

The FTTDp is a new access network type in which an optical fiber is laid to an outer wall of a residential house and the last distance within the residential house is still connected by using an in-house copper cable or a wireless interface, which reduces cost compared with that each user needs to lay an optical fiber in the FTTH type. A DPU (distribution point unit) is an ONU under the FTTDp type and is generally a cartridge device. The number of DPUs and of home gateways is in the same order of magnitude.

There exists at least a following problem in the prior art. Since a DPU is different from an MxU in structure and large in quantity, which leads to complex operation, maintenance and management, if a provider wants to add an access network node of the FTTDp type to an original network, a management system needs to be modified. However, the modification of the management system will increase cost of operation and maintenance, and interrupt service of a lot of existing access network users, thereby affecting the use of a network of a user and bringing inconvenience to the user.

SUMMARY

Embodiments of the present invention provide a method for access network virtualization and a proxy node, which may reduce a problem that an existing management system needs to be modified as a result of adding a new type of access network node to an original access network.

To achieve the above-mentioned purpose, an embodiment of the present invention adopts a following technical solution.

According to a first aspect, an embodiment of the present invention provides a method for access network virtualization, including:

establishing, by the proxy node, a relationship mapping table, where the relationship mapping table includes a mapping relationship of a network protocol IP address of a virtual access node AN, a user side port of the virtual AN and a user side port of the remote access node, where the virtual AN is a device which the management system is capable of managing;

receiving a packet sent by the management system;

querying the relationship mapping table according to first parameter information carried in the packet to obtain second parameter information; and sending the packet to a remote access node corresponding to the second parameter information according to the second parameter information.

With reference to the first aspect, in a first possible implementation manner, the first parameter information includes the user side port of the virtual AN and a destination IP address, where the destination IP address is an IP address of the virtual AN; and the second parameter information includes the user side port of the remote access node.

Optionally, the proxy node at least includes a first node and a second node, and the first node establishes the relationship mapping table, receives the packet, queries the relationship mapping table according to the first parameter information carried in the packet to obtain the second parameter information, and sends the second parameter information to the second node;

the second node sends the packet to the remote access node corresponding to the second parameter information according to the second parameter information.

With reference to the first possible implementation manner, in a second possible implementation manner, after the obtaining second parameter information, the method further includes:

modifying the user side port of the virtual AN in the packet to the user side port of the remote access node.

Optionally, the mapping relationship in the relationship mapping table further includes the remote access node identifier ID;

the first parameter information includes the user side port of the virtual AN and an IP address of the virtual AN, and the second parameter information includes the remote access node ID and the user side port of the remote access node;

the first node sending the second parameter information to the second node, includes:

modifying, by the first node, the user side port of the virtual AN in the packet to the user side port of the remote access node, and forwarding the packet to the second node, where the packet carries the remote access node ID and the user side port of the remote access node; and the second node sending the packet to the remote access node corresponding to the second parameter information according to the second parameter information, includes:

encapsulating, by the second node, the packet sent by the first node into a frame and adding the remote access node ID in the frame; and sending the frame to the corresponding remote access node.

With reference to the second possible implementation manner, in a third possible implementation manner, the sending the packet to a remote access node corresponding to the second parameter information according to the second parameter information includes:

encapsulating the packet into a frame and adding a remote access node identifier ID in the frame, where the remote access node identifier ID is obtained according to the user side port of the remote access node, or the remote access node identifier ID is obtained by querying the relationship mapping table according to the user side port of the virtual AN and the IP address of the virtual AN, where the mapping relationship in the relationship mapping table further includes the remote access node identifier ID; and sending the frame to the corresponding remote access node.

With reference to the first aspect or any one of the possible implementation manners, in a fourth possible implementation manner, the mapping relationship in the relationship mapping table further includes an IP address of the remote access node;

the second parameter information further includes the IP address of the remote access node.

With reference to the fourth possible implementation manner, in a fifth possible implementation manner, before the encapsulating the packet into a frame and adding the remote access node identifier ID in the frame, the method further includes: modifying the destination IP address in the packet to the IP address of the remote access node.

With reference to the first aspect or any one of the possible implementation manners, in a sixth possible implementation manner, the mapping relationship in the relationship mapping table further includes a user side port of the proxy node and the second parameter information further includes the user side port of the proxy node.

With reference to the first aspect or any one of the possible implementation manners, in a seventh possible implementation manner, the proxy node corresponds to at least two remote access nodes.

According to a second aspect, the embodiments of the present invention provide a proxy node, including:

an establishing unit, configured to establish a relationship mapping table, where the relationship mapping table includes a mapping relationship of a network protocol IP address of a virtual access node AN, a user side port of the virtual AN and a user side port of the remote access node, where the virtual AN is a device which the management system is capable of managing;

a receiving unit, configured to receive a packet sent by the management system;

a querying unit, configured to query the relationship mapping table established by the establishing unit according to first parameter information carried in the packet and received by the receiving unit, to obtain second parameter information; and a sending unit, configured to send the packet to a remote access node corresponding to the second parameter information according to the second parameter information queried by the querying unit.

With reference to the second aspect, in a first possible implementation manner, the first parameter information includes the user side port of the virtual AN and a destination IP address, where the destination IP address is an IP address of the virtual AN;

the second parameter information includes the user side port of the remote access node.

Optionally, the proxy node at least includes a first node and a second node, and the first node establishes the relationship mapping table, receives the packet, queries the relationship mapping table according to the first parameter information carried in the packet, obtains the second parameter information, and sends the second parameter information to the second node;

the second node sends the packet to the remote access node corresponding to the second parameter information according to the second parameter information.

With reference to the first possible implementation manner, in a second possible implementation manner, the proxy node further includes:

a modifying unit, configured to modify the user side port of the virtual AN in the packet received by the receiving unit to the user side port of the remote access node obtained by the querying unit.

Optionally, the mapping relationship in the relationship mapping table further includes the remote access node identifier ID;

the first parameter information includes the user side port of the virtual AN and an IP address of the virtual AN, and the second parameter information includes the remote access node ID and the user side port of the remote access node;

the first node sending the second parameter information to the second node, includes:

modifying, by the first node, the user side port of the virtual AN in the packet to the user side port of the remote access node, and forwarding the packet to the second node, where the packet carries the remote access node ID and the user side port of the remote access node;

the second node sending the packet to the remote access node corresponding to the second parameter information according to the second parameter information, includes:

encapsulating, by the second node, the packet sent by the first node into a frame and adding the remote access node ID in the frame; and sending the frame to the corresponding remote access node.

With reference to the second possible implementation manner, in a third possible implementation manner, the sending unit includes:

an encapsulating subunit, configured to encapsulate the packet modified by the modifying unit into a frame and add a remote access node identifier ID in the frame, where the remote access node identifier ID is obtained according to the user side port of the remote access node, or the remote access node identifier ID is obtained by querying the relationship mapping table according to the user side port of the virtual AN and the IP address of the virtual AN, where the mapping relationship in the relationship mapping table further includes the remote access node identifier ID;

a sending subunit, configured to send the frame encapsulated by the encapsulating subunit to a corresponding remote access node.

With reference to the second aspect or any one of the possible implementation manners, in a fourth possible implementation manner, the mapping relationship in the relationship mapping table further includes an IP address of the remote access node;

the second parameter information further includes the IP address of the remote access node.

With reference to the fourth possible implementation manner, in a fifth possible implementation manner, the modifying unit is further configured to modify the destination IP address in the packet received by the receiving unit to the IP address of the remote access node obtained by the querying unit.

With reference to the second aspect or any one of the possible implementation manners, in a sixth possible implementation manner, the mapping relationship in the relationship mapping table further includes a user side port of the proxy node and the second parameter information further includes the user side port of the proxy node.

With reference to the second aspect or any one of the possible implementation manners, in a seventh possible implementation manner, the proxy node corresponds to at least two remote access nodes.

According to a method for access network virtualization and a proxy node provided in an embodiment of the present invention, compared with a problem in the prior art that operation and maintenance cost is increased caused by a modification of an existing operation and maintenance support system when a new type (e.g. FTTDp) of access network node (i.e., the remote access node) is added into an original network, a relationship mapping table is set on the proxy node in the present invention, where the relationship mapping table includes a mapping relationship of a network protocol IP address of a virtual access node AN, a user side port of the virtual AN and a user side port of the remote access node, where the virtual AN is a device which the management system is capable of managing; after receiving the packet sent by the management device, the proxy node queries the relationship mapping table according to the packet content; and then the packet is sent to the corresponding remote access node according to a querying result. In this way, the existing management system does not need to be modified, thereby reducing the operation and maintenance cost and shortening integration time of the system, such that the influence on other users will be reduced. Further, multiple remote access nodes may also be virtualized to one virtual AN, and since the provider performs management and control in units of virtual ANs, rather than performing management and maintenance on a large number of remote access nodes directly, the operation and maintenance cost is greatly reduced.

BRIEF DESCRIPTION OF DRAWINGS

To illustrate the technical solutions provided in the embodiments of the present invention more clearly, a brief introduction on the accompanying drawings which are needed in the embodiments will be given below. Apparently, the accompanying drawings in the description below are merely some of the embodiments of the present invention, based on which other drawings may be obtained by those skilled in the art without any inventive efforts.

DETAILED DESCRIPTION OF EMBODIMENTS

A clear description of technical solutions provided in the embodiments of the present invention will be given below, in conjunction with the accompanying drawings in the embodiments of the present invention. Apparently, the embodiments described below are merely a part, but not all, of the embodiments of the present invention. All of other embodiments, obtained by those skilled in the art based on the embodiments of the present invention without any inventive efforts, fall into the protection scope of the present invention.

It should be noted that, a proxy node in a present embodiment is illustrated by merely taking an OLT and an IP edge node as examples. In actual implementation process, the proxy node may also be a node in other types, for example, an aggregation node, and a specific type of the proxy node will not be defined herein.

A technical solution provided in an embodiment of the present invention may be used to an access network, where the access network includes a remote access node, a proxy node and a management system. The remote access node may be various devices such as an ONU, an ONT, a DPU, an MxU, a DSLAM (digital subscriber line access multiplexer), a switch or a CMTS (cable modem terminal system) or the like, and the remote access node is connected to a client device; the proxy node may be a device such as an OLT, a DSLAM, an IP (internet protocol) edge node, a switch, a router or the like, and data may be transmitted between the remote access node and the proxy node in various access manners, such as a DSL (digital subscriber line), an Ethernet (Ethernet), a PON (passive optical network) or the like; and the management system may be a router, a server or the like, which may transmit data with the proxy node by using a packet.

Figure 1:
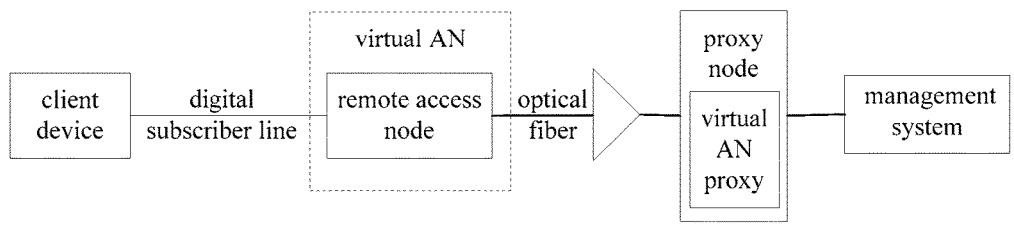
FIG. 1 is a network architecture diagram provided by an embodiment of the present invention.
Figure 2:
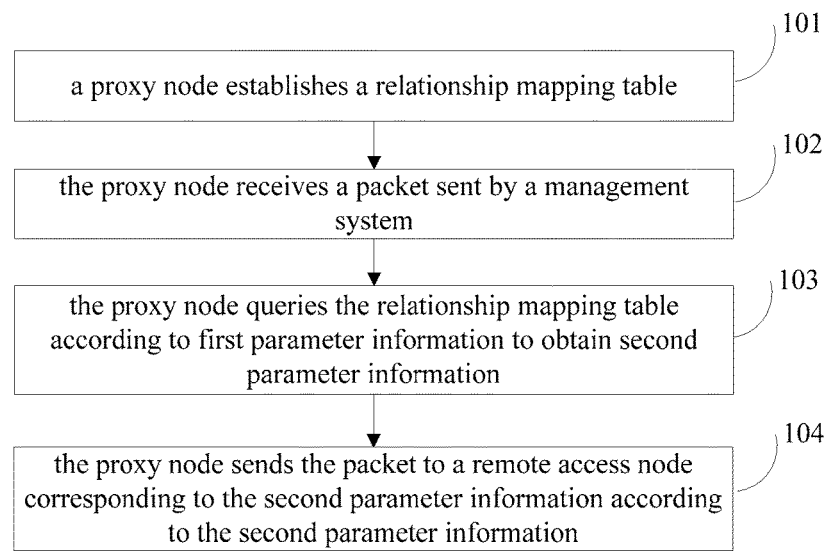
FIG. 2 is a flow diagram of a method provided by an embodiment of the present invention.

An embodiment of the present invention provide a method for access network virtualization, as shown in FIG. 1, a remote access node (which is generally a miniaturized device) is virtualized as an access node which may be identified by a management system, namely a virtual AN. A provider performs control and management on the remote access node in accordance with the virtual AN by setting a virtual AN (access node) proxy, for example, a virtual AN (access node) proxy may be set at a proxy node, and a provider network management or a management system performs control and management on the remote access node by using the virtual AN proxy. As shown in FIG. 2, the method includes followings.

101. A proxy node establishes a relationship mapping table.

The relationship mapping table includes a mapping relationship of a network protocol IP address of a virtual access node AN, a user side port of the virtual AN and a user side port of the remote access node, where the virtual AN is a device which the management system is capable of managing.

Optionally, if an IP address is allocated to the remote access node, the mapping relationship in the relationship mapping table may further include the IP address of the remote access node.

102. The proxy node receives a packet sent by a management system.

The packet carries the user side port of the virtual AN and a destination IP address, where the destination IP address is an IP address of the virtual AN.

103. The proxy node queries the relationship mapping table according to first parameter information carried in the packet to obtain second parameter information.

It should be noted that the first parameter information includes the user side port of the virtual AN and the destination IP address; and the second parameter information includes the user side port of the remote access node.

The proxy node queries the relationship mapping table according to the user side port of the virtual AN and the IP address of the virtual AN to obtain the user side port of the remote access node and modifies the user side port of the virtual AN in the packet to the user side port of the remote access node.

Optionally, if an IP address is allocated to the remote access node, by querying the relationship mapping table the second parameter information further includes the IP address of the remote access node. When the packet is modified, the destination IP address in the packet needs to be modified to the IP address of the remote access node.

104. The proxy node sends the packet to a remote access node corresponding to the second parameter information according to the second parameter information.

The proxy node encapsulates the packet into a frame, adds a remote access node ID (identifier) in the frame and then sends the frame to a corresponding remote access node.

Optionally, the remote access node ID is obtained according to the user side port of the remote access node, or the remote access node identifier ID is obtained by querying the relationship mapping table according to the user side port of the virtual AN and the IP address of the virtual AN. In the second case, the mapping relationship in the relationship mapping table further includes the remote access node identifier ID.

Optionally, the proxy node at least includes a first node and a second node. The first node establishes the relationship mapping table, receives the packet, queries the relationship mapping table according to the first parameter information carried in the packet to obtain the second parameter information, and sends the second parameter information to the second node; and the second node sends the packet to the remote access node corresponding to the second parameter information according to the second parameter information.

Further, the mapping relationship in the relationship mapping table further includes a remote access node identifier ID. The first parameter information includes the user side port of the virtual AN and an IP address of the virtual AN, and the second parameter information includes the remote access node ID and the user side port of the remote access node. The first node sending the second parameter information to the second node includes: the first node modifies the user side port of the virtual AN in the packet to the user side port of the remote access node and forwards the packet to the second node, where the packet carries the remote access node ID and the user side port of the remote access node. The second node sending the packet to the remote access node corresponding to the second parameter information according to the second parameter information includes: the second node encapsulates the packet sent by the first node into a frame, adds the remote access node ID in the frame, and sends the frame to a corresponding remote access node.

It should be noted that, the mapping relationship in the relationship mapping table may further include a user side port of the proxy node. Accordingly, the second parameter information may further include the user side port of the proxy node, such that the proxy node may determine from which user side port of the proxy node a packet is sent by querying the relationship mapping table when sending the packet to the remote access node.

In addition, in an embodiment, a proxy node corresponds to at least two remote access nodes and multiple remote access nodes are virtualized into one virtual AN. In this way, it may reduce the pressure of a management system for managing a large number of remote access nodes.

For example, when the proxy node establishes the relationship mapping table, it may allocate the IP address to the virtual AN. The IP address of the virtual AN may be allocated manually and the management system needs to be informed after the IP address is allocated.

Optionally, a manner of informing the management system of the IP address of the virtual AN may be that the proxy node broadcasts the IP address of the virtual AN by using a protocol to inform the management system to update an address in a routing table. Alternatively, address information in the management system is updated manually.

It should be noted that, an optimal manner that a virtual AN proxy is set at the proxy node to assist the management system in performing control and management on the remote access node is that an IP address is allocated to each virtual AN, rather than that an IP address is allocated to each remote access node, such that allocation and management of the IP address may be reduced, and operation and maintenance cost may be reduced.

In the prior art, when a new type (e.g. FTTDp) of access network node (i.e., the remote access node) is added into an original network, an existing management system needs to be modified, thereby increasing operation and maintenance cost. Compared with the prior art, a relationship mapping table is set on the proxy node in the embodiment of the present invention, where the relationship mapping table includes a mapping relationship of an IP address of a virtual AN, a user side port of the virtual AN and a user side port of the remote access node, where the virtual AN is a device which the management system is capable of managing; after receiving the packet sent by the management device, the proxy node queries the relationship mapping table according to the packet content; and then the packet is sent to the corresponding remote access node according to querying result. In this way, problems in the prior art that the operation and maintenance cost is increased and quality of network service provided for users is reduced are solved. As the above technical problem is solved, the existing management system does not need to be modified, so that the operation and maintenance cost may be reduced and integration time of the system may be shortened, thereby reducing influence on other users. Further, multiple remote access nodes may also be virtualized to one virtual AN, and since the provider performs management and control in units of virtual ANs, rather than performing management and maintenance on a large number of remote access nodes directly, the operation and maintenance cost is greatly reduced.

Figure 3:
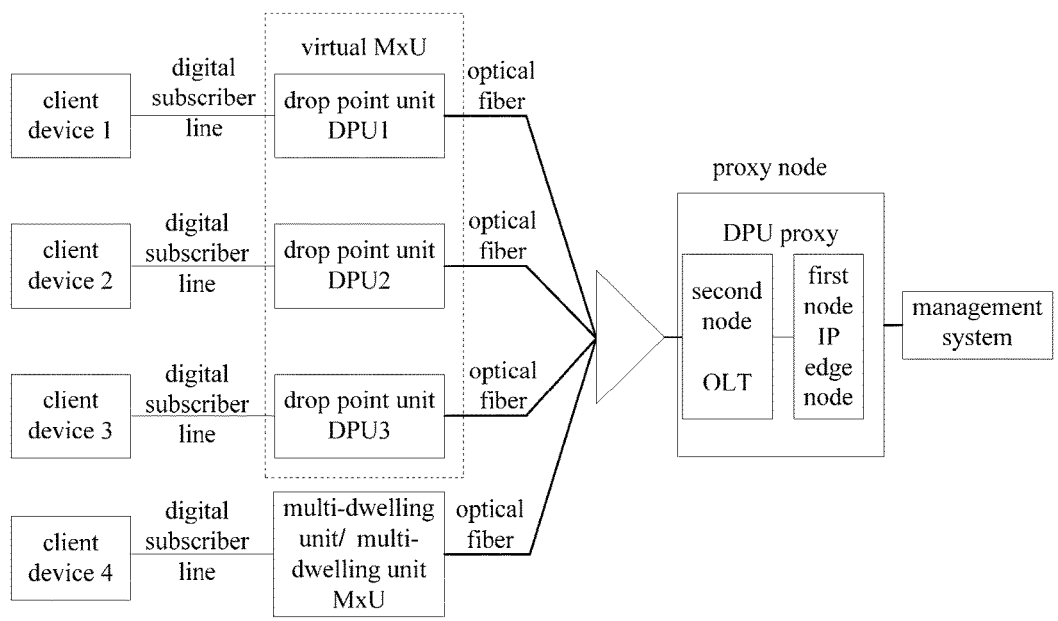
FIG. 3 is a network architecture diagram provided by another embodiment of the present invention.
Figure 4:
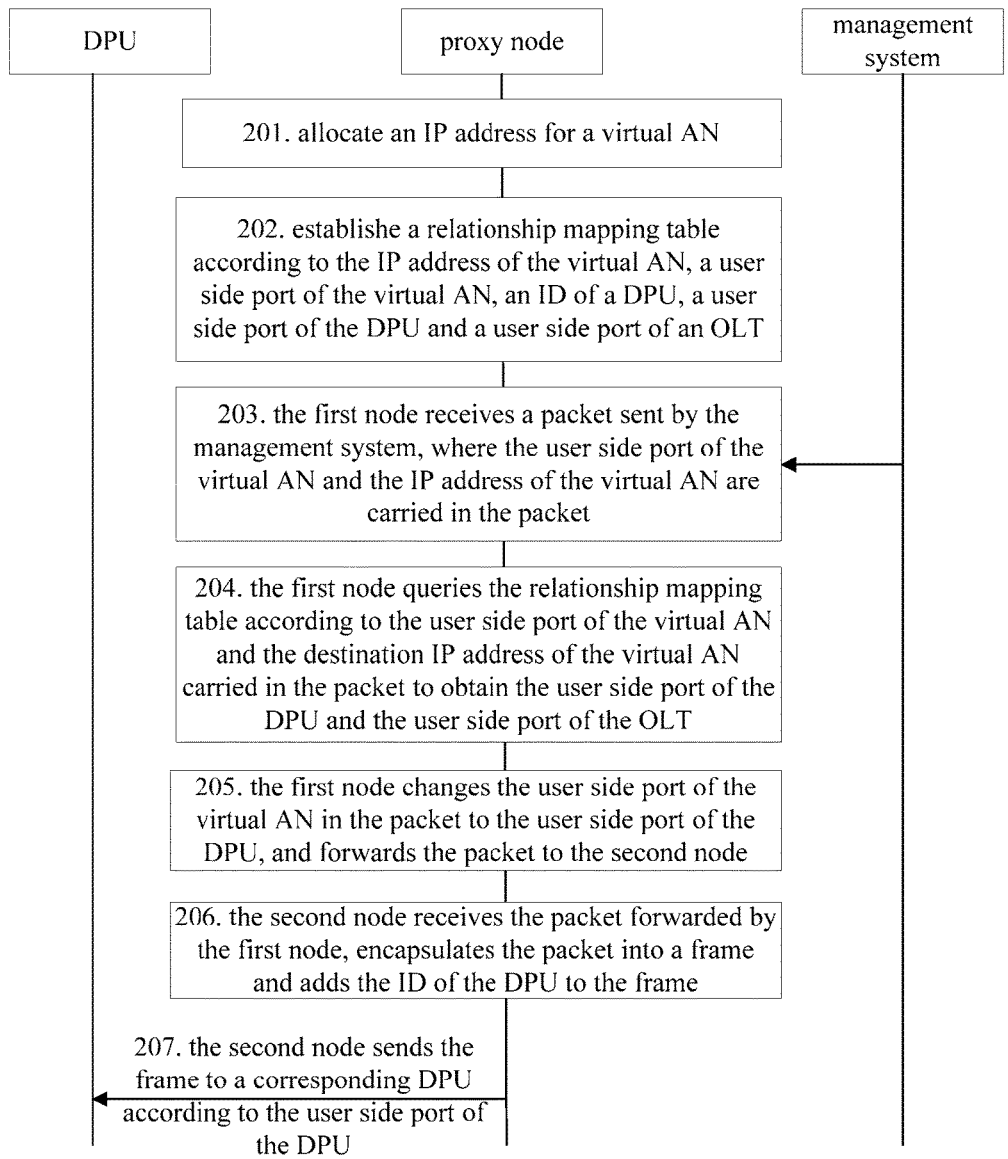
FIGS. 4-7 are flow diagrams of a method provided by another embodiment of the present invention.

Another embodiment of the present invention provides a method for access network virtualization, which is used for a proxy node. The proxy node includes a first node and a second node, an IP edge node is taken as an example for the first node, and an OLT is taken as an example for the second node. A network architecture is shown in FIG. 3, client device 1, client device 2 and client device 3 are connected to DPU1, DPU2 and DPU3, respectively, and DPU1, DPU2 and DPU3 are connected to the OLT, which is an FTTDp type access network; client device 4 is connected to an MxU and the MxU is connected to the OLT, which is an FTTB or FTTC type access network. During an implementation of the present invention, a virtual AN proxy is set on the proxy node, namely a DPU proxy, and then a management system performs control and management on three DPUs in accordance with a virtualization MxU by using the virtual AN proxy. The virtual AN proxy corresponds to the three DPUs, namely, the three DPUs are virtualized into one MxU, i.e., a virtual AN. In order to distinguish from other MxUs in the network, the virtual MxU is marked as MxU1. The virtual AN proxy includes a first level DPU proxy and a second level DPU proxy, the first level DPU proxy is located at the IP edge node, and the second level DPU proxy is located at the OLT. As shown in FIG. 4, the method includes:

201. A proxy node allocates an IP address for a virtual AN.

An IP address may be allocated to each virtual AN, which may be allocated manually, and the management system needs to be informed after the IP address is allocated.

Optionally, a manner of informing the management system of the IP address of the virtual AN may be that the proxy node broadcasts the IP address of the virtual AN by using a protocol to inform the management system to update an address in a routing table; or address information in the management system is updated manually.

202. The proxy node establishes a relationship mapping table according to the IP address of the virtual AN, a user side port of the virtual AN, an ID of the DPU, a user side port of the DPU and a user side port of an OLT.

For example, in a network shown in FIG. 2, a virtual AN proxy is set at the proxy node, an IP address is allocated as 10.66.93.110, and the virtual AN proxy corresponds to the three DPUs: DPU1, DPU2 and DPU3. There is only one user side port in each of DPU1 and DPU2, and there are four user side ports in DPU3; DPU1, DPU2 and DPU3 are connected to the user side port of the OLT. The relationship mapping table is established according to above-mentioned information, as shown in table 1.

TABLE 1

| IP address of virtual AN | virtual AN user side port | ID of the DPU | user side port of DPU | user side port of OLT |
|---|---|---|---|---|
| 10.66.93.110 | MxU1/slot1/port1 | 1 | DPU1/port1 | OLT1/slot1/port1 |
| | MxU1/slot2/port1 | 2 | DPU2/port1 | OLT1/slot1/port1 |
| | MxU1/slot3/port1 | 3 | DPU3/slot1/port1 | OLT1/slot1/port1 |
| | MxU1/slot3/port2 | 3 | DPU3/slot1/port2 | OLT1/slot1/port1 |
| | MxU1/slot3/port3 | 3 | DPU3/slot1/port3 | OLT1/slot1/port1 |
| | MxU1/slot3/port4 | 3 | DPU3/slot1/port4 | OLT1/slot1/port1 |

It should be noted that, an information format of user side port of each access node is: (an access node ID, a port number and a virtual local area network ID). The access node ID may be a remote node identifier, a proxy node identifier or a virtual AN identifier; the port number may be a combination of one or multiple of a chassis number, a rack number, a frame number, a slot number, a sub-slot number and a port number of a device; the virtual local area network ID may be an options, and when user side port information of the access node is used, the virtual local area network ID may not be included.

203. The first node receives a packet sent by the management system, where the user side port of the virtual AN and an IP address of the virtual AN are carried in the packet.

A type of packet that the management system sends to the OLT may be a PPPoE (point-to-point protocol over Ethernet) packet, a DHCP (dynamic host configuration protocol) packet, an ANCP (access node control protocol) packet or an SNMP (simple network management protocol) packet, etc. If data in the packet needs to transmit to a DPU corresponding to the virtual AN, the user side port of the virtual AN and a destination IP address are carried in the packet, and the destination IP address is the IP address of the virtual the AN.

For example, as shown in table 1, if data in the packet received by the proxy node needs to be transmitted to DPU1,
the user side port of the virtual AN carried in the packet is MxU1/slot1/port1 and the destination IP address is 10.66.93.110.

204. The first node queries the relationship mapping table according to the user side port of the virtual AN and the destination IP address of the virtual AN carried in the packet to obtain the user side port of the DPU and the user side port of the OLT.

It should be noted that, after receiving the packet, the proxy node may determine whether the packet is a packet that sends to the DPU corresponding to the virtual AN according to the destination IP address.

205. The first node modifies the user side port of the virtual AN in the packet to the user side port of the DPU, and forwards the packet to the second node.

The packet carries the user side port of the OLT and the user side port of the DPU.

Optionally, the packet may also carry the ID of the DPU.

For example, as shown in table 1, if data in the packet received by the proxy node needs to be transmitted to DPU1, after the relationship mapping table is queried at the IP edge node, the user side port of the virtual AN MxU1/slot1/port1 carried in the packet is modified to DPU1/port1 and then the packet is forwarded.

206. The second node receives the packet forwarded by the first node, encapsulates the packet into a frame and adds the ID of the DPU in the frame.

For example, the ID of the DPU may be obtained according to the user side port of the DPU, such as it obtains from a name of the user side port of the DPU, and at this time the name of the user side port of the DPU conforms to certain naming conventions. For example, the user side port of the DPU DPU1/port1 in table 1 denotes the ID of the DPU is 1 and the port number of the DPU is 1. For another example, the ID of the DPU may also be obtained by querying the relationship mapping table at the IP edge node in step 204 and sent to the OLT by using the above-mentioned packet. Frame encapsulation is the prior art and is generally divided into: filling a header field of a frame, filling a data field, calculating and filling a CRC (cyclic redundancy check) check code. The ID of the DPU needs to be added in the frame when the frame is encapsulated.

207. The second node sends the frame to a corresponding DPU according to the user side port of the DPU.

The OLT sends the frame from a user side port and the frame is transmitted to a corresponding DPU through an ODU.

For example, if the OLT sends the frame to DPU1, it needs to send the frame from port OLT1/slot1/port1, and then transmit to DPU1 through an ODU.

Figure 5:
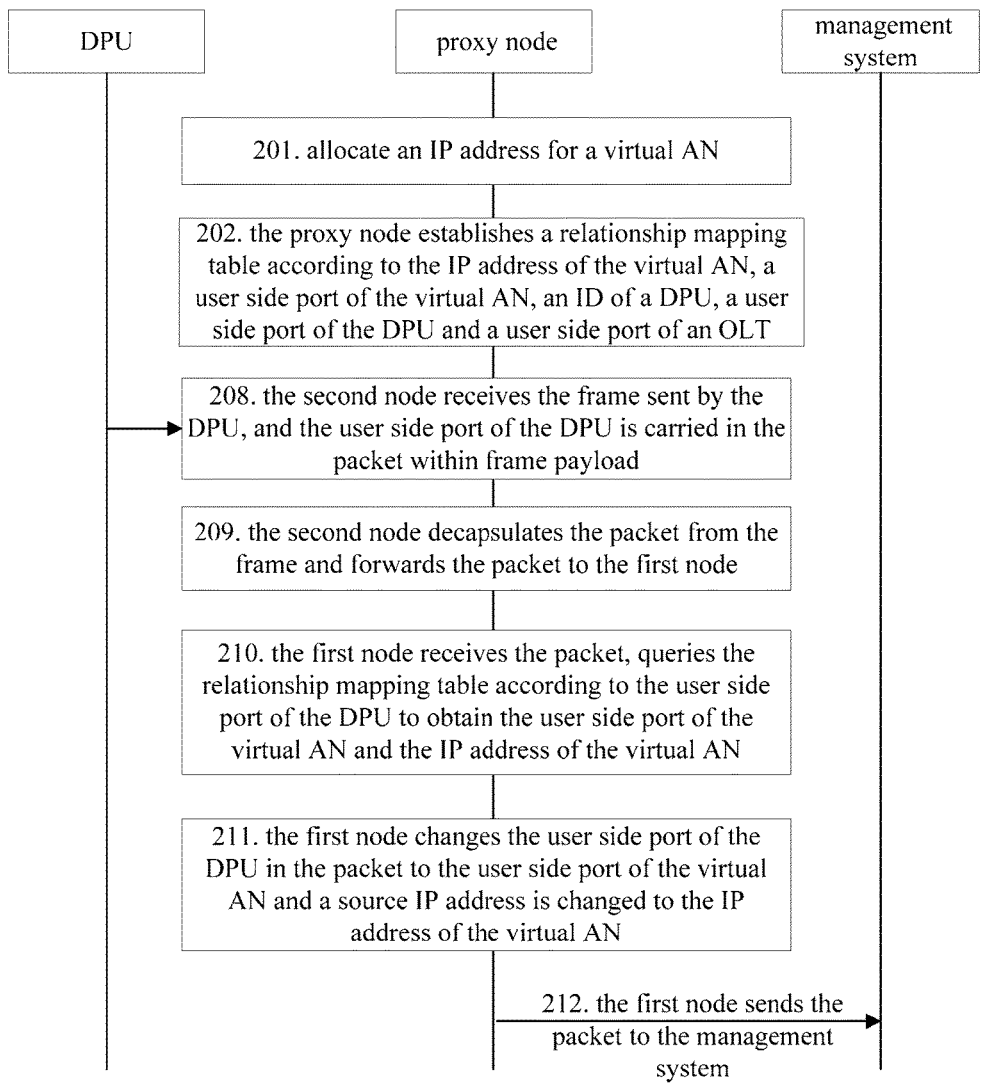

Optionally, after establishing the relationship mapping table, the proxy node processes data between the DPU and the management system according to corresponding relationship in the table. The above-mentioned step is a process that the proxy node processes downstream data, and when the proxy node processes upstream data, as shown in FIG. 5, after step 201 and step 202, it may also includes step 208 to step 212.

208. The second node receives the frame sent by the DPU, and the user side port of the DPU is carried in the packet within frame payload.

The OLT receives the frame sent by the DPU from the user side port and the user side port of the DPU is carried in the packet within frame payload.

209. The second node decapsulates the packet from the frame and forwards the packet to the first node.

Decapsulation is the prior art, which aims to read data carried in the frame.

210. The first node receives the packet, queries the relationship mapping table according to the user side port of the DPU to obtain the user side port of the virtual AN and the IP address of the virtual AN.

The user side port of the DPU may be obtained from decapsulated packet and the relationship mapping table is queried according to the user side port of the DPU and the ID of the DPU. The user side port of the virtual AN and the IP address of the virtual AN corresponding to the DPU may be obtained by querying the relationship mapping table.

211. The first node modifies the user side port of the DPU in the packet to the user side port of the virtual AN and a source IP address is modified to the IP address of the virtual AN.

For example, as shown in table 1, the proxy node receives the frame sent by DPU1 and modifies DPU1/port1 in the decapsulated packet to MxU1/slot1/port1, and modifies the source IP address to 10.66.93.110.

212. The first node sends the packet to the management system.

The sent packet carries the user side port of the virtual AN and the IP address of the virtual AN. A type of the packet may be a PPPoE packet, a DHCP packet, an ANCP packet or an SNMP packet or the like.

Figure 6:
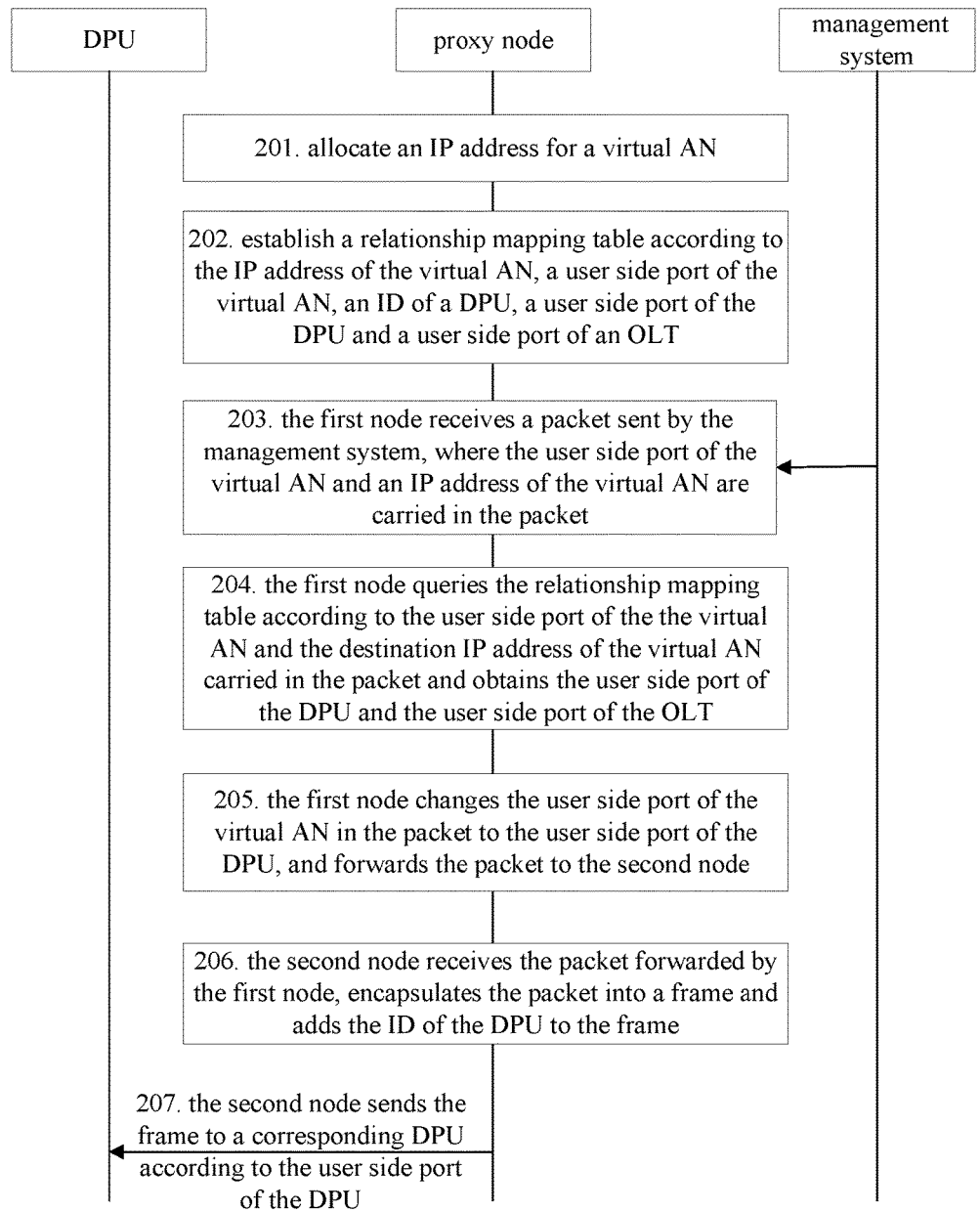
Figure 7:
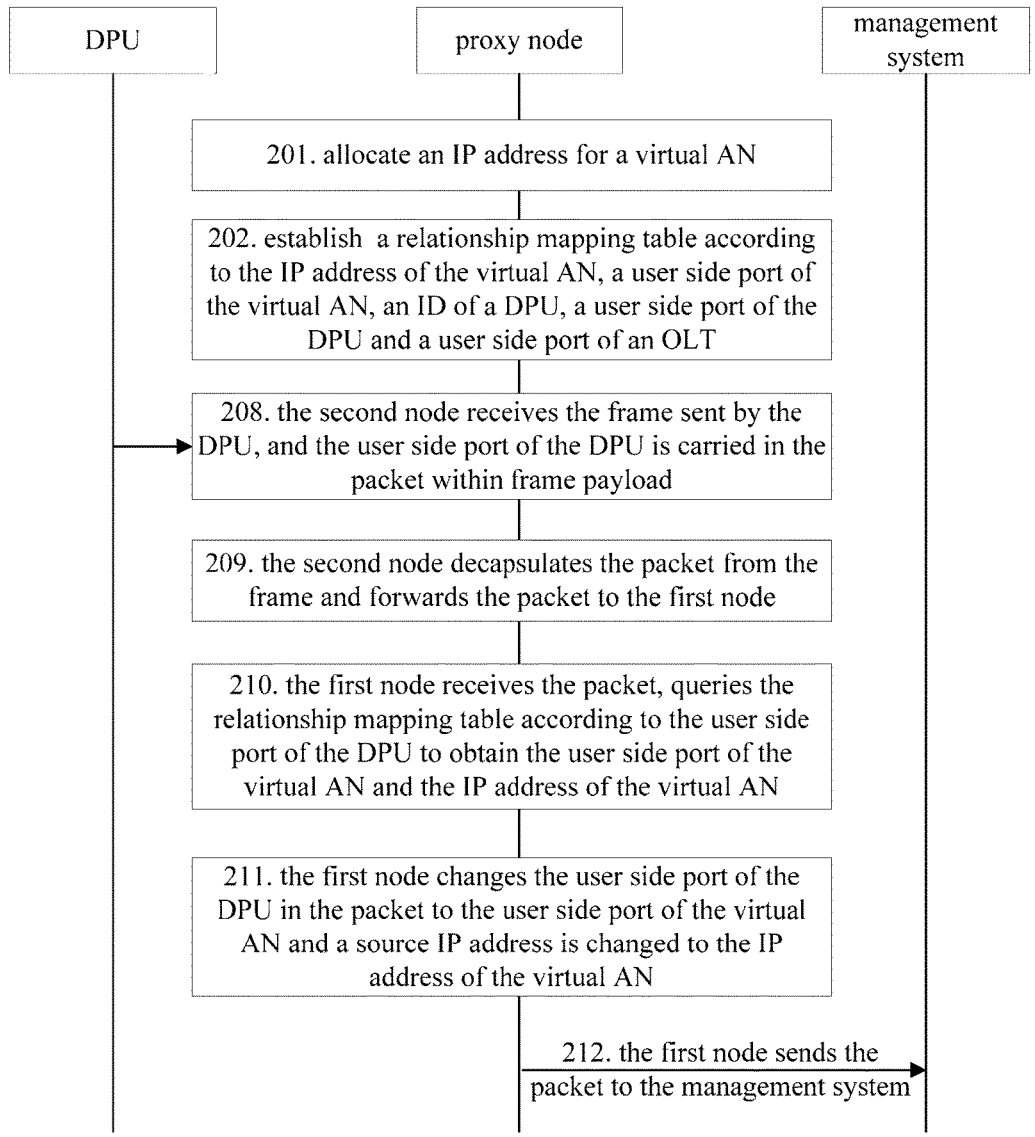

Optionally, in a network shown in FIG. 3, an IP address may be allocated for each DPU. If an IP address is allocated to the DPU, an IP address entry of the DPU is also included when the relationship mapping table is established in step 202, and the established relationship mapping table is shown in table 2; in step 204 and step 210, the relationship mapping table of table 2 needs to be queried; in step 205, the destination IP address in the packet also needs to be modified to the IP address of the DPU. When the proxy node possesses downstream data, a method process is shown in FIG. 6; when the proxy node possesses upstream data, a method process is shown in FIG. 7.

TABLE 2

| IP address of virtual AN | virtual AN user side port | ID of the DPU | IP address of the DPU | user side port of DPU | user side port of OLT |
| --- | --- | --- | --- | --- | --- |
| 10.66.93.110 | MxU1/slot1/port1 | 1 | 10.66.93.111 | DPU1/port1 | OLT1/slot1/port1 |
| | MxU1/slot2/port1 | 2 | 10.66.93.112 | DPU2/port1 | OLT1/slot1/port1 |
| | MxU1/slot3/port1 | 3 | 10.66.93.113 | DPU3/slot1/port1 | OLT1/slot1/port1 |
| | MxU1/slot3/port2 | 3 | | DPU3/slot1/port2 | OLT1/slot1/port1 |
| | MxU1/slot3/port3 | 3 | | DPU3/slot1/port3 | OLT1/slot1/port1 |
| | MxU1/slot3/port4 | 3 | | DPU3/slot1/port4 | OLT1/slot1/port1 |

It should be noted that, an optimal manner that a virtual AN proxy is set at the proxy node to assist the management system in performing control and management on the remote access node is that an IP address is allocated to each virtual AN, rather than that an IP address is allocated to each remote access node, such that allocation and management of the IP address may be reduced and operation and maintenance cost may be reduced.

Optionally, the proxy node may also only include one node and the node may be an OLT or an IP edge node, then above-mentioned processes of data processing are all completed on the node.

In the prior art, when a new type (e.g. FTTDp) of access network node (i.e., the remote access node) is added into an original network, an existing management system needs to be modified, thereby increasing operation and maintenance cost. Compared with the prior art, the virtual AN proxy is set on the proxy node in the embodiment of the present invention and a relationship mapping table is established in the virtual AN proxy, which includes a mapping relationship of an IP address of a virtual AN, a user side port of the virtual AN and a user side port of the DPU, where the virtual AN is a device which the management system is capable of managing; when downstream data is processed, after receiving a packet sent by the management system, the first node queries the relationship mapping table according to packet content, then modifies corresponding content according to querying result and then forwards it to the second node, and the second node sends the packet to a corresponding DPU; when upstream data is processed, the second node receives the packet and forwards it to the first node, the first node queries the relationship mapping table, modifies corresponding content and then sends the packet to the management system. In this way, problems in the prior art that the operation and maintenance cost is increased and quality of network service provided for users is reduced are solved. As the above technical problem is solved, the existing management system does not need to be modified, so that the operation and maintenance cost may be reduced and integration time of the system may be shortened, thereby reducing influence on other users. Further, multiple remote access nodes may also be virtualized to one virtual AN, and since the provider performs management and control in units of virtual ANs, rather than performing management and maintenance on a large number of remote access nodes directly, the operation and maintenance cost is greatly reduced.

Figure 8:
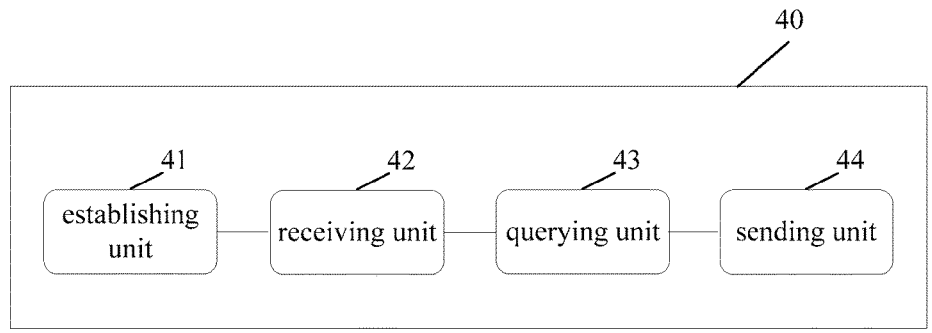
FIG. 8 and FIG. 9 are schematic diagrams of a structure of a proxy node provided by another embodiment of the present invention.

Yet another embodiment of the present invention provides a proxy node 40, as shown in FIG. 8, where the proxy node 40 includes:

an establishing unit 41, configured to establish a relationship mapping table, where the relationship mapping table includes a mapping relationship of a network protocol IP address of a virtual access node AN, a user side port of the virtual AN and a user side port of the remote access node, where the virtual AN is a device which the management system is capable of managing;

a receiving unit 42, configured to receive a packet sent by the management system;

a querying unit 43, configured to query the relationship mapping table established by the establishing unit 41 according to first parameter information carried in the packet and received by the receiving unit 42, to obtain second parameter information;

a sending unit 44, configured to send the packet to a remote access node corresponding to the second parameter information according to the second parameter information queried by the querying unit 43.

the first parameter information includes the user side port of the virtual AN and a destination IP address, where the destination IP address is an IP address of the virtual AN; the second parameter information includes the user side port of the remote access node.

Figure 9:
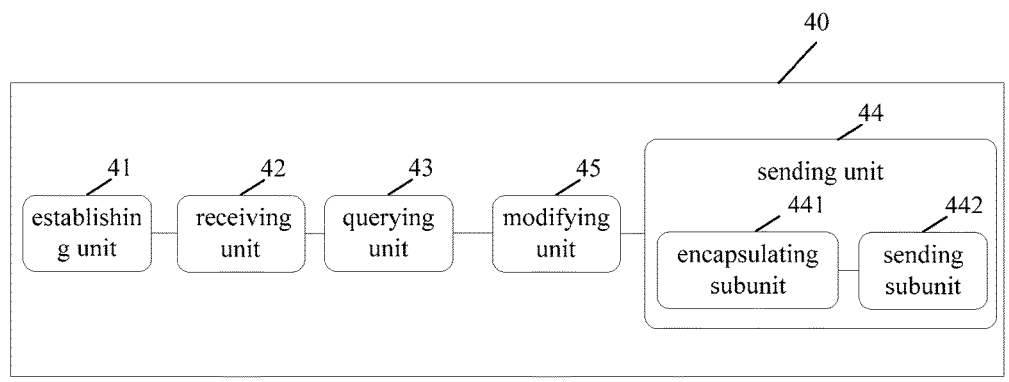

Further, as shown in FIG. 9, the proxy node 40 further includes:

a modifying unit 45, configured to modify the user side port of the virtual AN received by the receiving unit 42 in the packet to the user side port of the remote access node obtained by the querying unit 43.

Further, as shown in FIG. 9, the sending unit 44 includes:

an encapsulating subunit 441, configured to encapsulate the packet modified by the modifying unit 45 into a frame and add a remote access node identifier ID in the frame, where the remote access node identifier ID is obtained according to the user side port of the remote access node, or the remote access node identifier ID is obtained by querying the relationship mapping table according to the user side port of the virtual AN and the IP address of the virtual AN, where the mapping relationship in the relationship mapping table further includes the remote access node identifier ID;

a sending subunit 442, configured to send the frame encapsulated by the encapsulating subunit 441 to a corresponding remote access node.

The mapping relationship in the relationship mapping table further includes an IP address of the remote access node; the second parameter information further includes the IP address of the remote access node.

Further, the modifying unit 45 is further configured to:

modify the destination IP address received by the receiving unit 42 in the packet to the IP address of the remote access node obtained by the querying unit 43.

The mapping relationship in the relationship mapping table further includes a user side port of the proxy node and the second parameter information further includes the user side port of the proxy node. The proxy node corresponds to at least two remote access nodes.

Optionally, the proxy node at least includes a first node and a second node, and the first node establishes the relationship mapping table, receives the packet, queries the relationship mapping table according to the first parameter information carried in the packet, obtains the second parameter information, and sends the second parameter information to the second node; the second node sends the packet to the remote access node corresponding to the second parameter information according to the second parameter information. The mapping relationship in the relationship mapping table further includes the remote access node identifier ID; the first parameter information includes the user side port of the virtual AN and an IP address of the virtual AN, and the second parameter information includes the remote access node ID and the user side port of the remote access node; the first node sending the second parameter information to the second node, includes: modifying, by the first node, the user side port of the virtual AN in the packet to the user side port of the remote access node, and forwarding the packet to the second node, where the packet carries the remote access node ID and the user side port of the remote access node; the second node sending the packet to the remote access node corresponding to the second parameter information according to the second parameter information, includes: encapsulating, by the second node, the packet sent by the first node into a frame and adding the remote access node ID in the frame; and sending the frame to the corresponding remote access node.

In the prior art, when a new type (e.g. FTTDp) of access network node (i.e., the remote access node) is added into an original network, an existing management system needs to be modified, thereby increasing operation and maintenance cost. Compared with the prior art, a relationship mapping table is set on the proxy node 40 in the embodiment of the present invention, where the relationship mapping table includes a mapping relationship of an IP address of a virtual AN, a user side port of the virtual AN and a user side port of the remote access node, where the virtual AN is a device which the management system is capable of managing; after receiving the packet sent by the management device, the proxy node 40 queries the relationship mapping table according to the packet content; and then the packet is sent to the corresponding remote access node according to querying result. In this way, problems in the prior art that the operation and maintenance cost is increased and quality of network service provided for users is reduced are solved. As the above technical problem is solved, the existing management system does not need to be modified, so that the operation and maintenance cost may be reduced and integration time of the system may be shortened, thereby reducing influence on other users. Further, multiple remote access nodes may also be virtualized to one virtual AN, and since the provider performs management and control in units of virtual ANs, rather than performing management and maintenance on a large number of remote access nodes directly, the operation and maintenance cost is greatly reduced.

Figure 10:
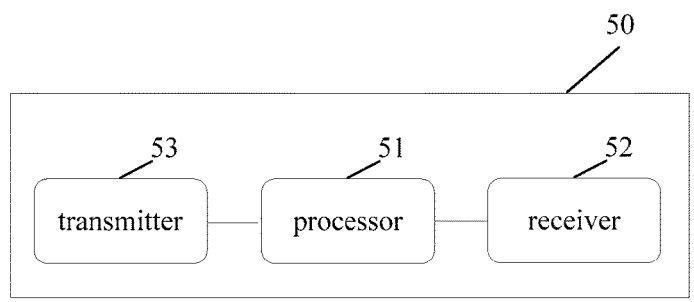
FIG. 10 is a schematic diagram of a structure of a proxy node provided by another embodiment of the present invention.

Yet another embodiment of the present invention provides a proxy node 50, as shown in FIG. 10, the proxy node 50 includes:

a processor 51, configured to establish a relationship mapping table, where the relationship mapping table includes a mapping relationship of a network protocol IP address of a virtual access node AN, a user side port of the virtual AN and a user side port of the remote access node, where the virtual AN is a device which the management system is capable of managing;

a receiver 52, configured to receive a packet sent by the management system;

the processor 51 is further configured to query the relationship mapping table according to first parameter information carried in the packet to obtain second parameter information;

a transmitter 53, configured to send the packet to a remote access node corresponding to the second parameter information according to the second parameter information.

The first parameter information includes the user side port of the virtual AN and a destination IP address, where the destination IP address is an IP address of the virtual AN; the second parameter information includes the user side port of the remote access node.

Further, the processor 51 is further configured to modify the user side port of the virtual AN in the packet to the user side port of the remote access node.

Further, the processor 51 is further configured to encapsulate the packet modified by the modifying unit into a frame and add a remote access node identifier ID in the frame, where the remote access node identifier ID is obtained according to the user side port of the remote access node, or the remote access node identifier ID is obtained by querying the relationship mapping table according to the user side port of the virtual AN and the IP address of the virtual AN, where the mapping relationship in the relationship mapping table further includes the remote access node identifier ID;

The transmitter 53 is further configured to send the frame encapsulated by the encapsulating subunit to a corresponding remote access node.

The mapping relationship in the relationship mapping table further includes an IP address of the remote access node; the second parameter information further includes the IP address of the remote access node.

Further, the processor 51 is further configured to modify the destination IP address in the packet to the IP address of the remote access node.

The mapping relationship in the relationship mapping table further includes a user side port of the proxy node and the second parameter information further includes the user side port of the proxy node. The proxy node corresponds to at least two remote access nodes.

Optionally, the proxy node at least includes a first node and a second node, and the first node establishes the relationship mapping table, receives the packet, queries the relationship mapping table according to the first parameter information carried in the packet, obtains the second parameter information, and sends the second parameter information to the second node; the second node sends the packet to the remote access node corresponding to the second parameter information according to the second parameter information. The mapping relationship in the relationship mapping table further includes the remote access node identifier ID; the first parameter information includes the user side port of the virtual AN and an IP address of the virtual AN, and the second parameter information includes the remote access node ID and the user side port of the remote access node; the first node sending the second parameter information to the second node, includes: modifying, by the first node, the user side port of the virtual AN in the packet to the user side port of the remote access node, and forwarding the packet to the second node, where the packet carries the remote access node ID and the user side port of the remote access node; the second node sending the packet to the remote access node corresponding to the second parameter information according to the second parameter information, includes: encapsulating, by the second node, the packet sent by the first node into a frame and adding the remote access node ID in the frame; and sending the frame to the corresponding remote access node.

In the prior art, when a new type (e.g. FTTDp) of access network node (i.e., the remote access node) is added into an original network, an existing management system needs to be modified, thereby increasing operation and maintenance cost. Compared with the prior art, a relationship mapping table is set on the proxy node 50 in the embodiment of the present invention, where the relationship mapping table includes a mapping relationship of an IP address of a virtual AN, a user side port of the virtual AN and a user side port of the remote access node, where the virtual AN is a device which the management system is capable of managing; after receiving the packet sent by the management device, the proxy node 50 queries the relationship mapping table according to the packet content; and then the packet is sent to the corresponding remote access node according to querying result. In this way, problems in the prior art that the operation and maintenance cost is increased and quality of network service provided for users is reduced are solved. As the above technical problem is solved, the existing management system does not need to be modified, so that the operation and maintenance cost may be reduced and integration time of the system may be shortened, thereby reducing influence on other users. Further, multiple remote access nodes may also be virtualized to one virtual AN, and since the provider performs management and control in units of virtual ANs, rather than performing management and maintenance on a large number of remote access nodes directly, the operation and maintenance cost is greatly reduced.

A proxy node provided in the embodiment of the present invention may implement the method embodiments provided above, its specific function implementation refers to descriptions in the method embodiments, and will not be repeated redundantly herein. An access network virtualization method and a proxy node provided in the embodiment of the present invention may be applicable to a proxy node, but it is not limited hereto.

Each embodiment in the present description is described in a progressive manner, same or similar portion among each of embodiments may refer to each other, and each embodiment focuses on illustration of the difference from other embodiments. In particular, for the device embodiments, since they are basically similar to the method embodiments, the illustration is simple and related portions may refer to partial illustration of the method embodiments.

Those of ordinary skill in the art may understand that all or a part of the steps for achieving the above-mentioned method embodiments may be implemented with a computer program instructing corresponding hardware. The foregoing program may be stored in a computer readable storage medium. When being executed, the program may execute the steps of the above-mentioned method embodiments. The foregoing storage medium may be a magnetic disk, an optical disk, a read-only memory (ROM) or a random access memory (RAM) and the like.

The foregoing descriptions are merely specific embodiments of the present invention, rather than limiting the protection scope of the present invention. Any skilled one who is familiar with this art could readily think of modifications or substitutions within the disclosed technical scope of the present invention, and these modifications or substitutions shall fall within the protection scope of the present invention. Accordingly, the protection scope of the claims should prevail over the protection scope of the present invention.

What is claimed is:

1. A method for access network virtualization, applied in a system comprising a first remote access node and a second remote access node, a proxy node and a management system, wherein the method comprises:
    establishing, by the proxy node, a relationship mapping table, wherein the relationship mapping table comprises a first mapping relationship and a second mapping relationship, wherein the first mapping relationship comprises an Internet protocol (IP) address of a virtual access node (AN), a first user side port of the virtual AN and a user side port of the first remote access node, wherein the second mapping relationship comprises the IP address of the virtual AN, a second user side port of the virtual AN and a user side port of the second remote access node, wherein the virtual AN is a device which the management system is capable of managing;
    receiving a packet sent by the management system;
    querying the relationship mapping table according to first parameter information carried in the packet to obtain second parameter information, wherein the first parameter information comprises the IP address of the virtual AN and the first user side port of the virtual AN, and wherein the second parameter information comprises the user side port of the first remote access node; and
    sending the packet to the first remote access node corresponding to the user side port of the first remote access node according to the second parameter information.

2. The method according to claim 1, wherein after the obtaining the second parameter information, the method further comprises:
    modifying the first user side port of the virtual AN carried in the packet to the user side port of the first remote access node.

3. The method according to claim 2, wherein the sending the packet to the first remote access node corresponding to the user side port of the first remote access node according to the second parameter information comprises:

encapsulating the packet into a frame and adding a first remote access node identifier (ID) in the frame, wherein the first remote access node ID is obtained using one of following manners: the first remote access node ID being obtained according to the user side port of the first remote access node, and the first remote access node ID being obtained by querying the relationship mapping table according to the first user side port of the virtual AN and the IP address of the virtual AN, wherein the first mapping relationship further comprises the first remote access node ID; and sending the frame to the first remote access node.

4. The method according to claim 1, wherein the proxy node comprises at least a first node and a second node, and the first node establishes the relationship mapping table, receives the packet, queries the relationship mapping table according to the first parameter information carried in the packet to obtain the second parameter information, and sends the second parameter information to the second node;

wherein the second node sends the packet to the first remote access node corresponding to the user side port of the first remote access node according to the second parameter information.

5. The method according to claim 4, wherein the first mapping relationship further comprises a first remote access node identifier (ID), wherein the second parameter information further comprises the first remote access node ID;

the first node sending the second parameter information to the second node, comprises:

modifying, by the first node, the first user side port of the virtual AN in the packet to the user side port of the first remote access node, and forwarding the packet to the second node, wherein the packet carries the first remote access node ID and the user side port of the first remote access node; and the second node sending the packet to the first remote access node corresponding to the user side port of the first remote access node according to the second parameter information, comprises:

encapsulating, by the second node, the packet sent by the first node into a frame and adding the first remote access node ID in the frame; and sending the frame to the first remote access node.

6. The method according to claim 1, wherein the first mapping relationship further comprises an IP address of the first remote access node; and the second parameter information further comprises the IP address of the first remote access node.

7. The method according to claim 5, wherein before the encapsulating the packet into the frame and adding the first remote access node ID in the frame, the method further comprises:

modifying the IP address of the virtual AN in the packet to the IP address of the first remote access node.

8. The method according to claim 1, wherein the first mapping relationship further comprises a first user side port of the proxy node, and the second parameter information further comprises the first user side port of the proxy node.

9. The method according to claim 1, wherein the proxy node corresponds to at least two remote access nodes.

10. A proxy node, comprising:

a processor, configured to establish a relationship mapping table, wherein the relationship mapping table comprises a first mapping relationship and a second mapping relationship, wherein the first mapping relationship comprises an Internet protocol (IP) address of a virtual access node (AN), a first user side port of the virtual AN and a user side port of a first remote access node, wherein the second mapping relationship comprises the IP address of the virtual AN, a second user side port of the virtual AN and a user side port of a second remote access node, and the virtual AN is a device which the management system is capable of managing;

a receiver, configured to receive a packet sent by the management system;

the processor is further configured to query the relationship mapping table according to first parameter information carried in the packet to obtain second parameter information, wherein the first parameter information comprises the IP address of the virtual AN and the first user side port of the virtual AN, and wherein the second parameter information comprises the user side port of the first remote access node; and a transmitter, configured to send the packet to the first remote access node corresponding to the user side port of the first remote access node according to the second parameter information.

11. The proxy node according to claim 10, wherein the processor is further configured to modify the first user side port of the virtual AN in the packet to the user side port of the first remote access node.

12. The proxy node according to claim 11, wherein the processor is further configured to encapsulate the packet into a frame and add a first remote access node identifier (ID) in the frame, wherein the first remote access node ID is obtained using one of following manners: the first remote access node ID being obtained according to the user side port of the first remote access node, and the first remote access node ID being obtained by querying the relationship mapping table according to the first user side port of the virtual AN and the IP address of the virtual AN, wherein the first mapping relationship further comprises the first remote access node ID; and the transmitter is configured to send the frame to the first remote access node.

13. The proxy node according to claim 10, wherein the proxy node comprises at least a first node and a second node, and the first node establishes the relationship mapping table, receives the packet, queries the relationship mapping table according to the first parameter information carried in the packet to obtain the second parameter information, and sends the second parameter information to the second node;

wherein the second node sends the packet to the first remote access node corresponding to the user side port of the first remote access node according to the second parameter information.

14. The proxy node according to claim 13, wherein the first mapping relationship further comprises a first remote access node identifier (ID), wherein the second parameter information further comprises the first remote access node ID;

the first node sending the second parameter information to the second node, comprises:

modifying, by the first node, the first user side port of the virtual AN in the packet to the user side port of the first remote access node, and forwarding the packet to the second node, wherein the packet carries the first remote access node ID and the user side port of the first remote access node; and the second node sending the packet to the first remote access node corresponding to the user side port of the first remote access node according to the second parameter information, comprises:
encapsulating, by the second node, the packet sent by the first node into a frame and adding the first remote access node ID in the frame; and sending the frame to the first remote access node.

15. The proxy node according to claim 10, wherein the first mapping relationship further comprises an IP address of the first remote access node; and
the second parameter information further comprises the IP address of the first remote access node.

16. The proxy node according to claim 15, wherein the processor is further configured to modify the IP address of the virtual AN in the packet to the IP address of the first remote access node.

17. The proxy node according to claim 10, wherein the first mapping relationship further comprises a first user side port of the proxy node, and the second parameter information further comprises the first user side port of the proxy node.

18. The proxy node according to claim 10, wherein the proxy node corresponds to at least two remote access nodes.

* * * * *